(12) United States Patent
Taherzadeh Boroujeni et al.

(10) Patent No.: US 12,219,608 B2
(45) Date of Patent: Feb. 4, 2025

(54) INTERACTION OF PRACH REPETITION AND REQUEST OF Msg3 REPETITION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/645,404

(22) Filed: Dec. 21, 2021

(65) Prior Publication Data

US 2023/0199852 A1    Jun. 22, 2023

(51) Int. Cl.
*H04W 74/0833*    (2024.01)

(52) U.S. Cl.
CPC .............................. *H04W 74/0833* (2013.01)

(58) Field of Classification Search
CPC .................................................. H04W 74/0833
USPC ........................................................ 370/329
See application file for complete search history.

(56) References Cited

U.S. PATENT DOCUMENTS

| | | | | |
|---|---|---|---|---|
| 9,860,919 B2* | 1/2018 | Yang | ...................... | H04W 74/08 |
| 11,723,032 B2* | 8/2023 | Yi | ........................ | H04L 5/0094 |
| | | | | 370/330 |
| 11,751,251 B2* | 9/2023 | Li | ...................... | H04W 74/0808 |
| | | | | 370/329 |
| 11,757,595 B2* | 9/2023 | Lin | ........................ | H04W 72/52 |
| | | | | 370/330 |
| 11,758,486 B2* | 9/2023 | Xu | ........................ | H04L 5/0094 |
| | | | | 455/522 |
| 11,778,536 B2* | 10/2023 | Kim | ........................ | H04W 4/70 |
| | | | | 370/329 |
| 11,805,524 B2* | 10/2023 | Liou | ...................... | H04W 72/23 |
| 11,805,555 B2* | 10/2023 | Agiwal | ................. | H04L 5/0053 |
| 11,818,761 B2* | 11/2023 | Höglund | ........... | H04W 74/0833 |
| 11,828,614 B2* | 11/2023 | Jung | ..................... | G06T 19/006 |
| 11,832,214 B2* | 11/2023 | Stojanovski | .......... | H04W 76/27 |
| 11,871,419 B2* | 1/2024 | Xiong | .................... | H04W 72/23 |
| 11,882,541 B2* | 1/2024 | Khoryaev | ........... | H04W 64/003 |

(Continued)

FOREIGN PATENT DOCUMENTS

EP    3780871 A1    2/2021
KR    20210153837 A    12/2021

OTHER PUBLICATIONS

International Search Report and Written Opinion—PCT/US2022/049859—ISA/EPO—Feb. 23, 2023.

(Continued)

*Primary Examiner* — Melvin H Pollack
(74) *Attorney, Agent, or Firm* — Procopio, Cory, Hargreaves & Savitch LLP

(57) ABSTRACT

Methods, apparatuses, and computer readable medium for PRACH repetition and Msg 3 repetition are provided. An example method may include receiving, from a base station, an indication associated with a set of PRACH resources. The example method may further include transmitting, to the base station, one or more PRACH repetitions using the set of PRACH resources. The example method may further include receiving, from the base station based on the one or more PRACH repetitions, a grant associated with a PUSCH repetition.

28 Claims, 10 Drawing Sheets

(56) References Cited

U.S. PATENT DOCUMENTS

| | | | |
|---|---|---|---|
| 11,882,548 B2* | 1/2024 | Höglund | H04W 72/23 |
| 11,882,556 B2* | 1/2024 | Xiong | H04B 7/0617 |
| 11,902,027 B2* | 2/2024 | Cozzo | H04W 72/046 |
| 11,902,985 B2* | 2/2024 | Mondal | H04L 5/0094 |
| 11,903,021 B2* | 2/2024 | Sun | H04W 74/008 |
| 11,903,034 B2* | 2/2024 | Xiong | H04L 1/08 |
| 11,910,433 B2* | 2/2024 | Li | H04L 5/0083 |
| 11,917,681 B2* | 2/2024 | Kusashima | H04W 74/0841 |
| 11,936,459 B2* | 3/2024 | Cirik | H04L 1/0026 |
| 11,950,108 B2* | 4/2024 | Noh | H04W 16/28 |
| 11,950,214 B2* | 4/2024 | Pitaval | H04W 74/008 |
| 11,956,834 B2* | 4/2024 | Maso | H04W 16/28 |
| 11,997,606 B2* | 5/2024 | Zhou | H04L 5/0051 |
| 12,004,232 B2* | 6/2024 | Wu | H04W 72/0446 |
| 12,004,235 B2* | 6/2024 | Lee | H04W 72/1268 |
| 12,010,540 B2* | 6/2024 | Xiong | H04W 24/10 |
| 12,028,867 B2* | 7/2024 | Li | H04L 1/1812 |
| 12,041,604 B2* | 7/2024 | Hwang | H04L 1/08 |
| 12,058,072 B2* | 8/2024 | Ko | H04L 1/0003 |
| 12,058,555 B2* | 8/2024 | Li | H04W 4/80 |
| 12,058,741 B2* | 8/2024 | Ye | H04B 7/18513 |
| 12,063,690 B2* | 8/2024 | Xiong | H04W 74/0833 |
| 12,069,733 B2* | 8/2024 | Ye | H04L 5/0053 |
| 12,095,540 B2* | 9/2024 | Ali | H04B 7/0639 |
| 12,096,405 B2* | 9/2024 | Wei | H04L 5/0032 |
| 12,096,478 B2* | 9/2024 | Christoffersson | H04W 74/0833 |
| 12,096,487 B2* | 9/2024 | Wang | H04W 74/0866 |
| 12,101,761 B2* | 9/2024 | Shimezawa | H04W 72/1268 |
| 12,101,763 B2* | 9/2024 | Islam | H04W 52/346 |
| 2018/0206271 A1* | 7/2018 | Chatterjee | H04W 72/21 |
| 2021/0251016 A1* | 8/2021 | Xiong | H04L 1/0072 |
| 2021/0360660 A1* | 11/2021 | Cozzo | H04L 1/1887 |
| 2021/0392699 A1 | 12/2021 | Park | |
| 2022/0132590 A1* | 4/2022 | Chen | H04W 74/0833 |
| 2022/0418001 A1* | 12/2022 | Chien | H04W 76/18 |
| 2023/0224891 A1* | 7/2023 | Noh | H04L 5/0048 370/329 |
| 2023/0224953 A1* | 7/2023 | Xiong | H04L 5/0044 370/329 |
| 2023/0262753 A1* | 8/2023 | Axnäs | H04W 74/008 370/329 |
| 2023/0276436 A1* | 8/2023 | Pi | H04L 1/0003 370/329 |
| 2023/0291496 A1* | 9/2023 | Lee | H04L 5/0091 |
| 2023/0300893 A1* | 9/2023 | Yoshimura | H04L 5/0092 370/328 |
| 2023/0354432 A1* | 11/2023 | Behravan | H04W 72/51 |
| 2023/0371081 A1* | 11/2023 | Ali | H04W 74/006 |
| 2023/0379904 A1* | 11/2023 | Kim | H04L 1/00 |
| 2023/0379965 A1* | 11/2023 | Zhang | H04W 74/04 |
| 2023/0388053 A1* | 11/2023 | Lei | H04L 1/08 |
| 2023/0397247 A1* | 12/2023 | Jung | H04B 7/18519 |
| 2024/0015794 A1* | 1/2024 | Ye | H04L 1/0025 |
| 2024/0015795 A1* | 1/2024 | Yao | H04W 74/0833 |
| 2024/0048275 A1* | 2/2024 | Liu | H04L 1/08 |
| 2024/0049292 A1* | 2/2024 | Liu | H04L 1/1893 |
| 2024/0073958 A1* | 2/2024 | Baldemair | H04B 7/0695 |
| 2024/0121830 A1* | 4/2024 | Ma | H04W 74/0866 |
| 2024/0224340 A1* | 7/2024 | Loehr | H04W 72/21 |
| 2024/0244667 A1* | 7/2024 | Echigo | H04W 72/04 |
| 2024/0260088 A1* | 8/2024 | Yoshimura | H04W 74/0833 |
| 2024/0283595 A1* | 8/2024 | Eriksson | H04L 1/1854 |
| 2024/0284193 A1* | 8/2024 | Matsumura | H04B 7/06958 |
| 2024/0284510 A1* | 8/2024 | Mahama | H04L 5/0012 |

OTHER PUBLICATIONS

Vivo: "Discussion on Type A PUSCH Repetition for Msg3", 3GPP TSG RAN WG1 #104-e, R1-2100461, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970383, pp. 1-7, Proposal 2, Section 2.2, 2.3, 2.4.

* cited by examiner

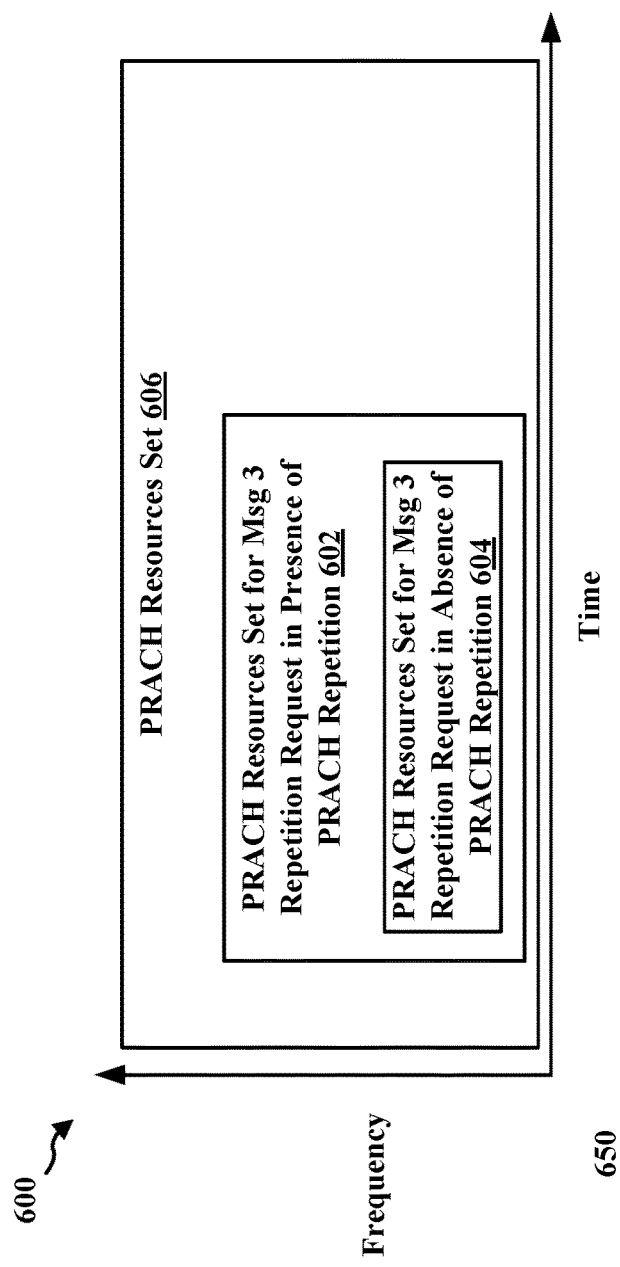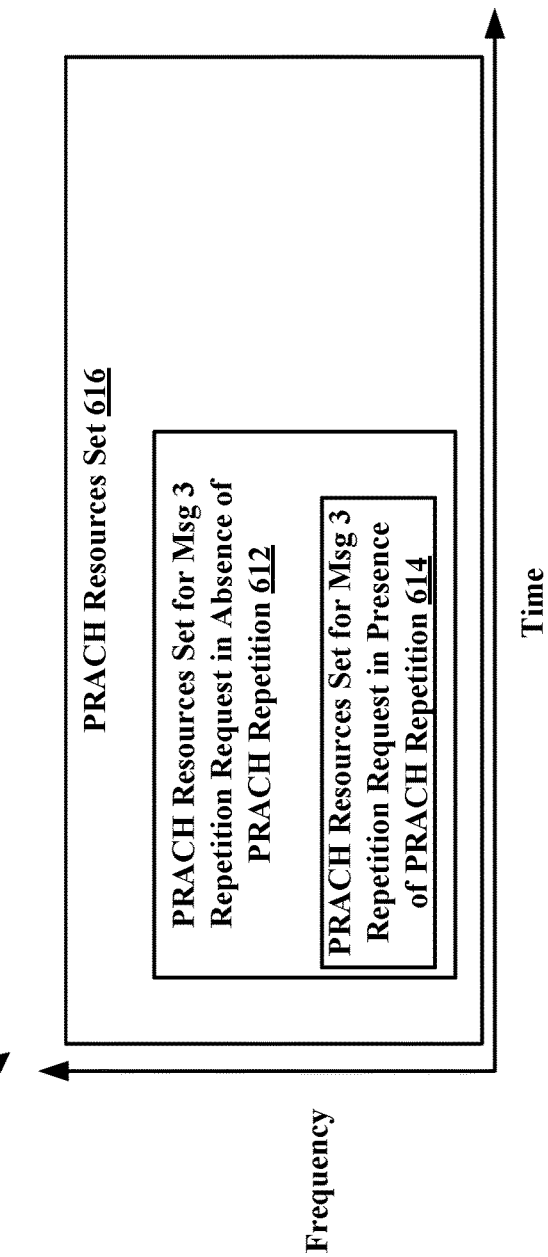

INTERACTION OF PRACH REPETITION AND REQUEST OF Msg3 REPETITION

TECHNICAL FIELD

The present disclosure relates generally to communication systems, and more particularly, to wireless communication systems with physical random access channel (PRACH) repetitions and physical uplink shared channel (PUSCH) repetitions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, from a base station, an indication associated with a set of PRACH resources. The memory and the at least one processor coupled to the memory may be further configured to transmit, to the base station, one or more PRACH repetitions using the set of PRACH resources. The memory and the at least one processor coupled to the memory may be further configured to receive, from the base station based on the one or more PRACH repetitions, a grant associated with a PUSCH repetition.

In another aspect of the disclosure, a method, a computer-readable medium, and an apparatus at a base station are provided. The apparatus may include a memory and at least one processor coupled to the memory. The memory and the at least one processor coupled to the memory may be configured to transmit, to a UE, an indication associated with a set of PRACH resources. The memory and the at least one processor coupled to the memory may be further configured to receive, from the UE, one or more PRACH repetitions using the set of PRACH resources. The memory and the at least one processor coupled to the memory may be further configured to transmit, to the UE based on the one or more PRACH repetitions, a grant associated with a PUSCH repetition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A and 6B are diagrams illustrating example PRACH resources.

DETAILED DESCRIPTION

Figure 1:
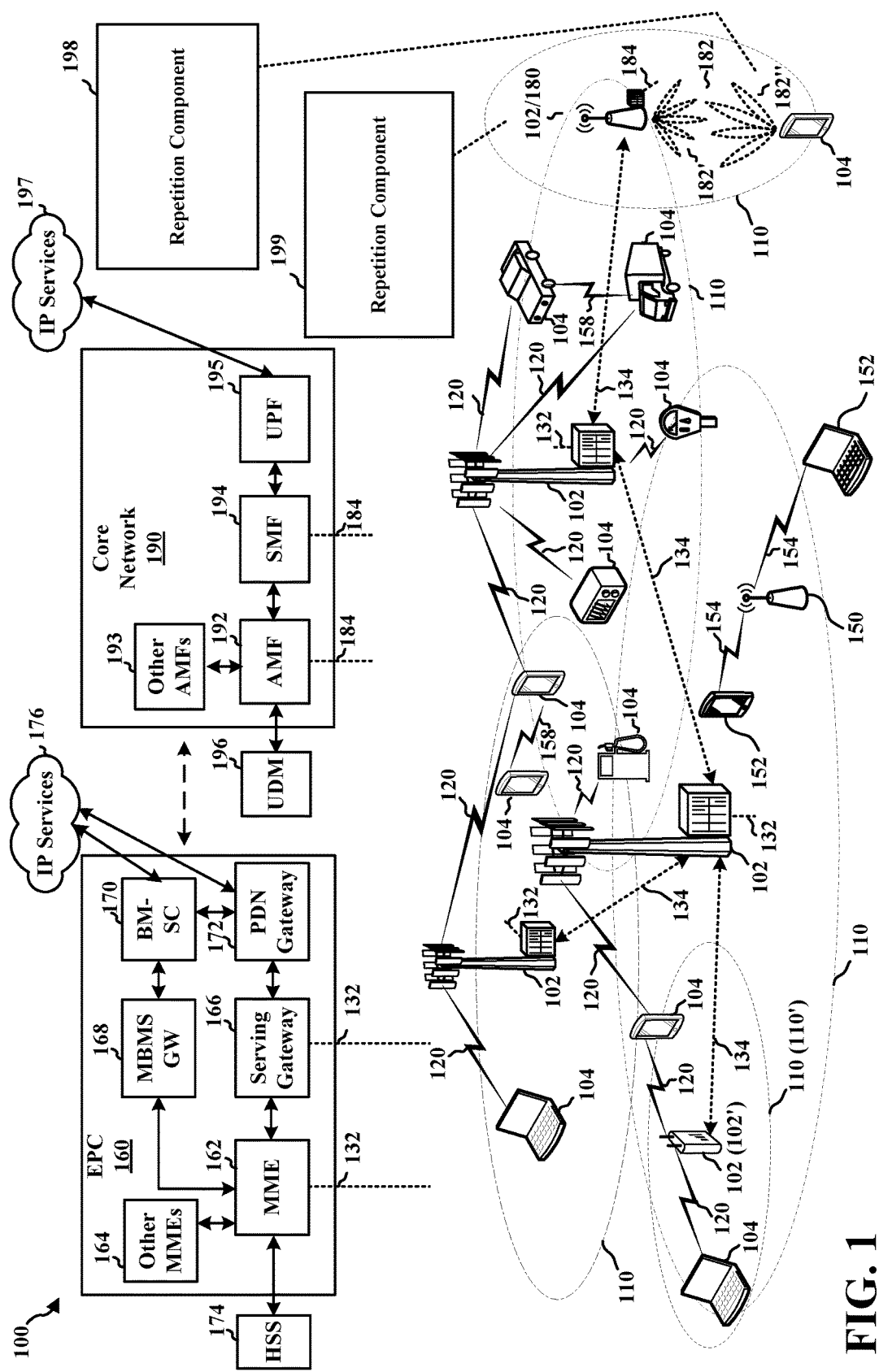
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a repetition component 198. In some aspects, the repetition component 198 may be configured to receive, from a base station, an indication associated with a set of PRACH resources. In some aspects, the repetition component 198 may be further configured to transmit, to the base station, one or more PRACH repetitions using the set of PRACH resources. In some aspects, the repetition component 198 may be further configured to receive, from the base station based on the one or more PRACH repetitions, a grant associated with a PUSCH repetition.

In some aspects, the base station 180 may include a repetition component 199. In some aspects, the repetition component 199 may be configured to transmit, to a UE, an indication associated with a set of PRACH resources. In some aspects, the repetition component 199 may be further configured to receive, from the UE, one or more PRACH repetitions using the set of PRACH resources. In some aspects, the repetition component 199 may be further configured to transmit, to the UE based on the one or more PRACH repetitions, a grant associated with a PUSCH repetition.

Although the following description may be focused on 5G NR, the concepts described herein may be applicable to other similar areas, such as LTE, LTE-A, CDMA, GSM, and other wireless technologies.

Figure 2:
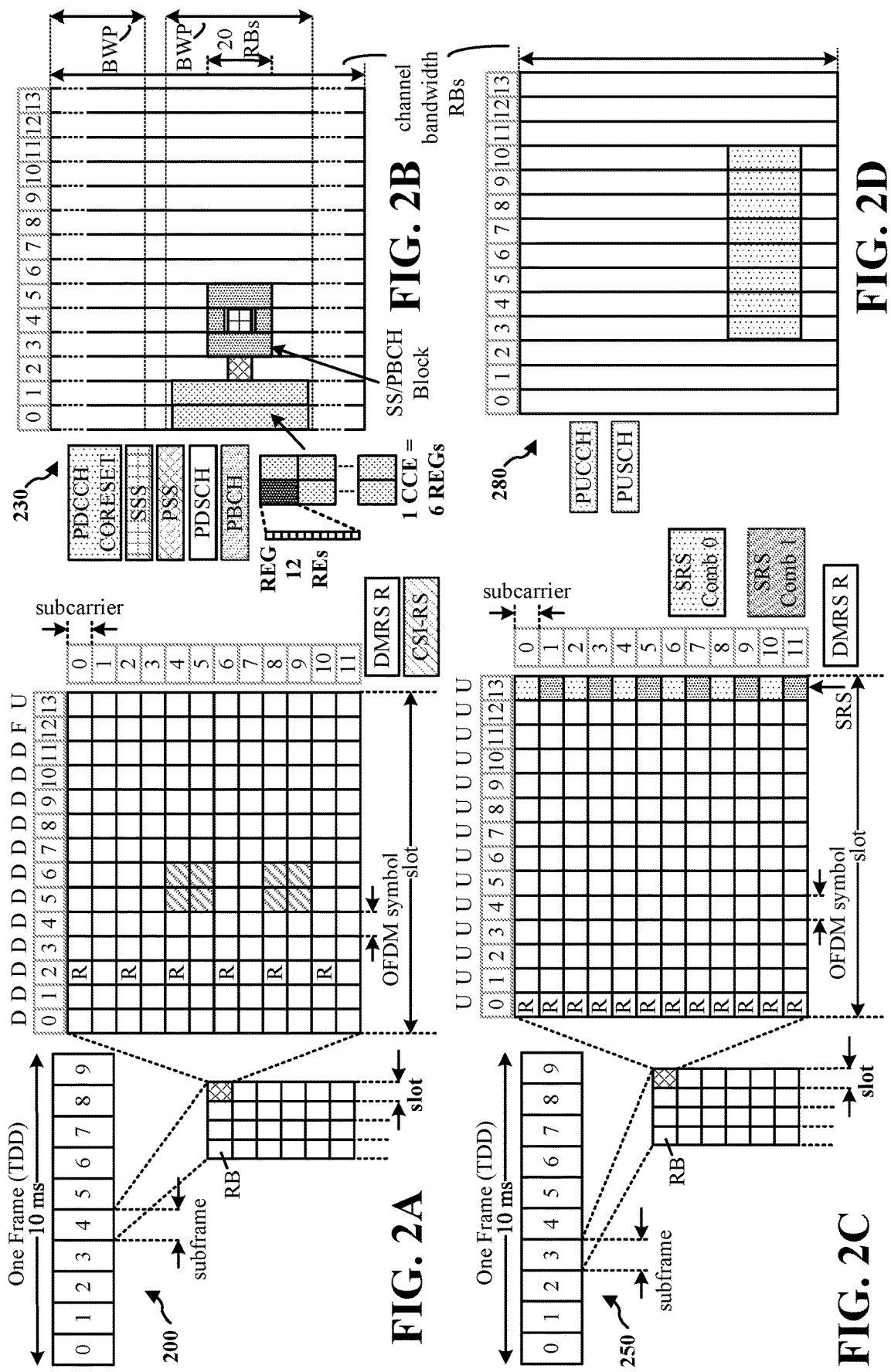
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
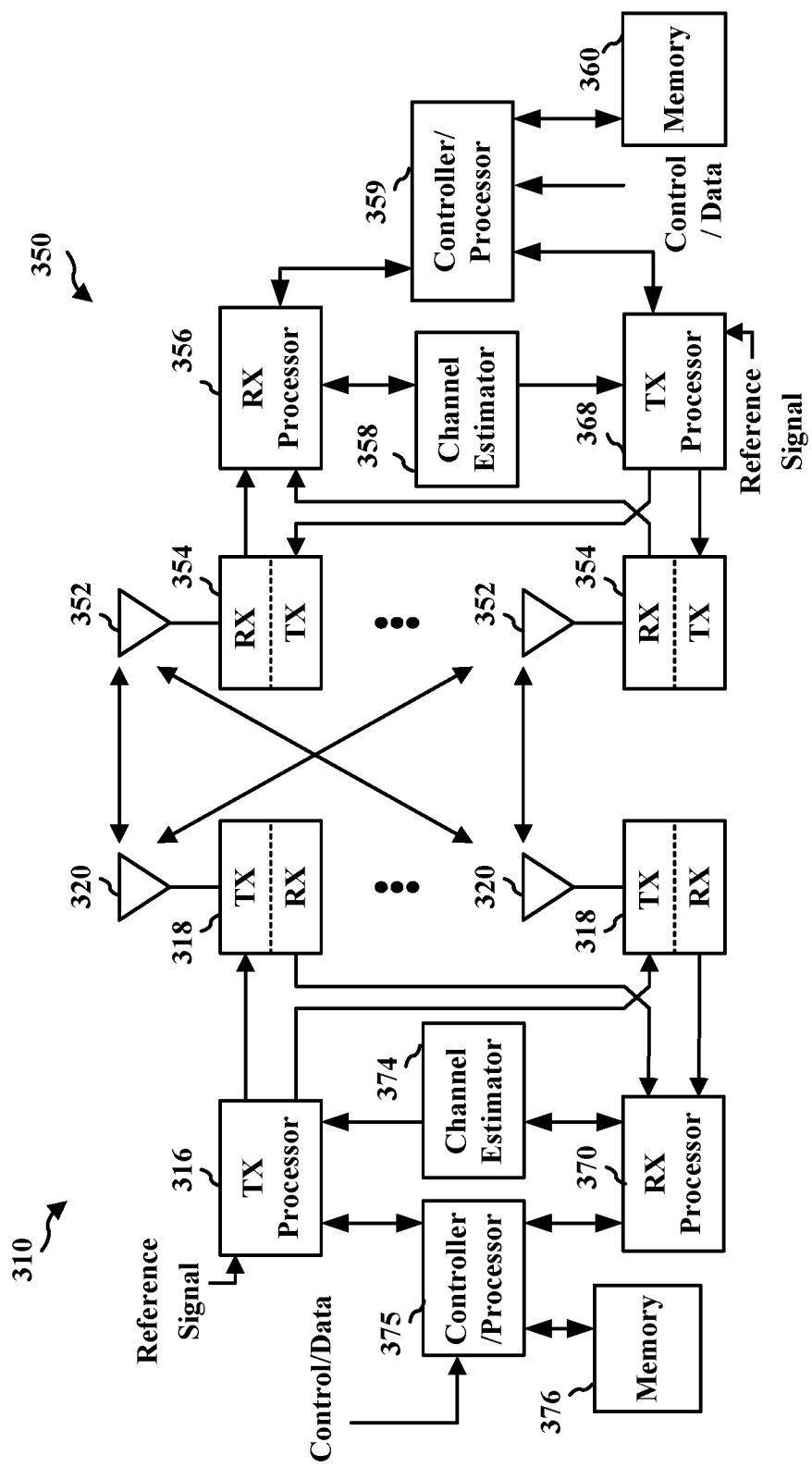
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with repetition component 198 of FIG. 1.

At least one of the TX processor 316, the RX processor 370, and the controller/processor 375 may be configured to perform aspects in connection with repetition component 199 of FIG. 1.

In some aspects of wireless communications, a UE may use a random access procedure (RACH) procedure in order to communicate with a base station. For example, the UE may use the random access procedure to request a radio resource control (RRC) connection, to re-establish an RRC connection, to resume an RRC connection, etc. RACH procedures may include a number of different types of random access procedures, e.g., contention based random access (CBRA) may be performed when a UE is not synchronized with a base station and contention free random access (CFRA) may be performed when a UE was previously synchronized with a base station. In CBRA, a UE may randomly select a RACH preamble sequence, e.g., from a set of RACH preamble sequences. As the UE randomly selects the RACH preamble sequence, the base station may receive another RACH preamble from a different UE at the same time. Thus, CBRA provides for the base station with the ability to resolve such contention among multiple UEs. In CFRA, the network may allocate a RACH preamble sequence to the UE rather than the UE randomly selecting a RACH preamble sequence. This may help to avoid potential collisions with a RACH preamble from another UE using the same sequence. Thus, CFRA may be referred to as "contention free" random access.

Figure 4:
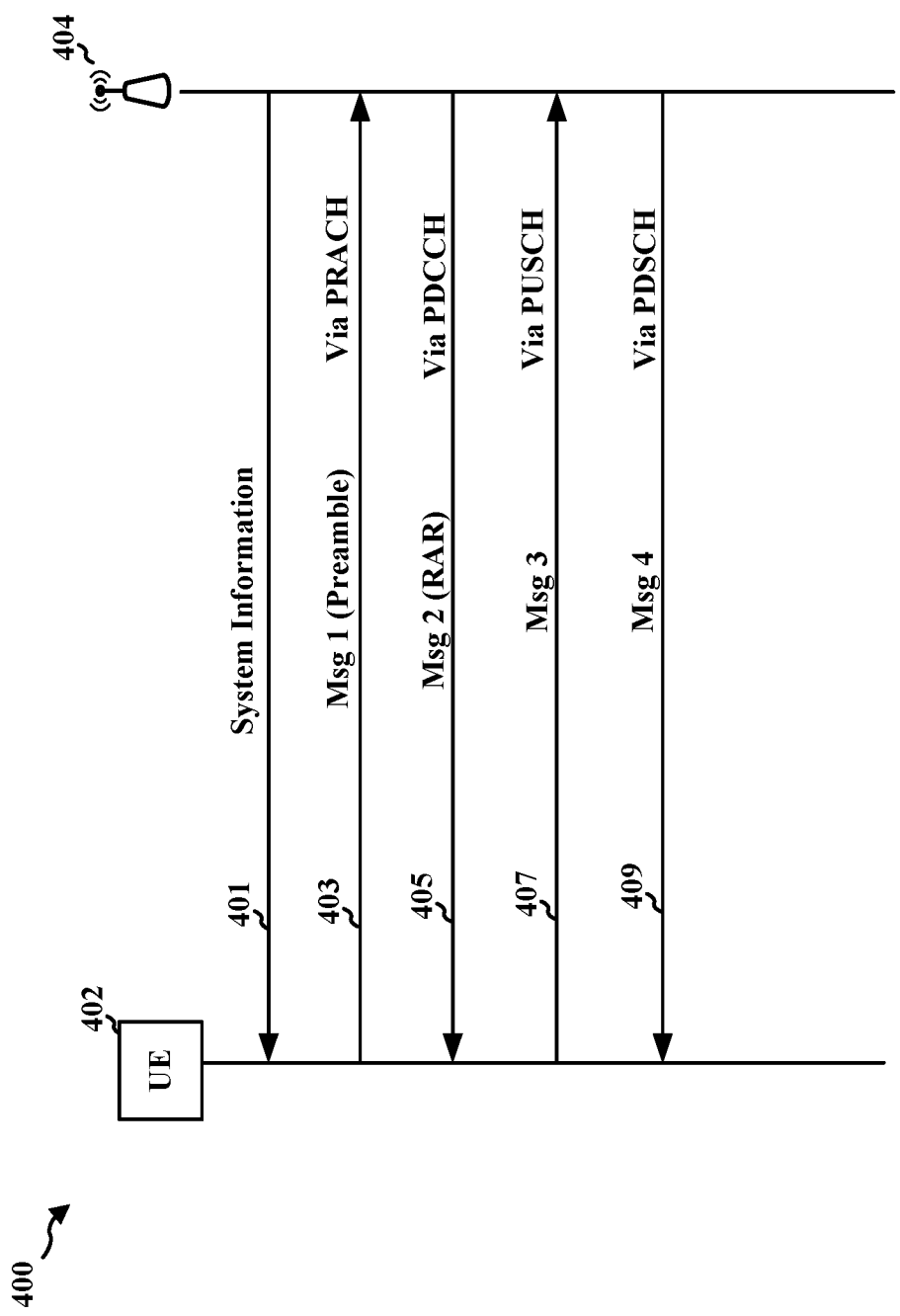
FIG. 4 is a diagram illustrating an example random access channel (RACH) procedure between a UE and a base station.

FIG. 4 is a diagram 400 illustrating an example RACH procedure between a UE 402 and a base station 404. The UE 402 may initiate the random access message exchange by sending, to the base station 404, a first random access message 403 (e.g., message 1 (Msg 1)) including a RACH preamble. Prior to sending the first random access message 403, the UE may obtain random access parameters (which may be otherwise referred to as PRACH configurations), e.g., including RACH preamble format parameters, PRACH resources (in the form of time and frequency), parameters for determining root sequences and/or cyclic shifts for a RACH preamble, etc., in system information 401 from the base station 404. A RACH preamble parameter may include a cyclic prefix (CP) and a preamble sequence. In some aspects, the preamble format may be one or more of: format 0, format 1, format 2, format 3, format A1, format A2, format A3, format B1, format B2, format B3, format B4, format C0, format C1, or the like.

Each of the preamble formats may be associated with a different CP and a different preamble sequence. A preamble format may be grouped into two categories: long preamble and short preamble. By way of example, a long preamble may last for more than 1 ms in the time domain and a short preamble may last for less than 1 ms in the time domain. For example, a long preamble may be based on a sequence length of L=839. A long preamble may include preamble format 0, format 1, format 2, and format 3. By way of example, an SCS associated with a long preamble may be 1.25 kHz or 5 kHz. A long preamble may be used for the FR1 frequency band. A long preamble with 1.25 kHz SCS may occupy, by way of example, 6 resource blocks in the frequency domain. A long preamble with 5 kHz may occupy, by way of example, 24 resource blocks in the frequency domain.

A short preamble may include preamble format A1, format A2, format A3, format B1, format B2, format B3, format B4, format C0, format C1. In some aspects, a short preamble may be based on a sequence length of L=139. In some aspects, an SCS associated with a short preamble may be 15 kHz, 30 kHz, 60 kHz, 120 kHz, or the like. A short preamble may occupy, by way of example, 12 resource blocks in the frequency domain independent of a preamble numerology. In some aspects, a last part of each OFDM symbol in the short preamble may act as a CP for the next OFDM symbol. In some aspects, the length of a preamble OFDM symbol may equal the length of data OFDM symbols. In some aspects, multiple short preambles may be multiplexed in time within a single RO.

A RACH preamble may be transmitted with an identifier, such as a random access RNTI (RA-RNTI). The UE 402 may randomly select a RACH preamble sequence, e.g., from a set of RACH preamble sequences corresponding to the preamble formats. If the UE 402 randomly selects the RACH preamble sequence, the base station 404 may receive another RACH preamble from a different UE at the same time. In some examples, a RACH preamble sequence may be assigned to the UE 402.

The base station may respond to the first random access message 403 by sending a second random access message 405 (e.g., Msg 2 or Msg2) using a PDSCH and including a random access response (RAR). The RAR may include, e.g., an identifier of the RACH preamble sent by the UE, a timing advance (TA), an uplink grant for the UE to transmit data, a cell radio network temporary identifier (C-RNTI) or other identifier, and/or a back-off indicator. Upon receiving the RAR (e.g., 405), the UE 402 may transmit a third random access message 407 (e.g., Msg 3 or Msg3) to the base station 404, e.g., using a PUSCH, that may include an RRC connection request, an RRC connection re-establishment request, or an RRC connection resume request, depending on the trigger for initiating the random access procedure. The base station 404 may then complete the random access procedure by sending a fourth random access message 409 (e.g., Msg 4 or Msg4) to the UE 402, e.g., using a PDCCH for scheduling and a PDSCH for the message. The fourth random access message 409 may include a random access response message that includes timing advancement information, contention resolution information, and/or RRC connection setup information. The UE 402 may monitor for a PDCCH, e.g., with the C-RNTI. If the PDCCH is successfully decoded, the UE 402 may also decode a PDSCH. The UE 402 may send HARQ feedback for any data carried in the fourth random access message. If two UEs sent a same RACH preamble at 703, both UEs may receive the RAR leading both UEs to send a third random access message 407. The base station 404 may resolve such a collision by being able to decode the third random access message from solely one of the UEs and responding with a fourth random access message to that UE. The other UE, which did not receive the fourth random access message 409, may determine that random access did not succeed and may re-attempt random access. Thus, the fourth message may be referred to as a contention resolution message. The fourth random access message 409 may complete the random access procedure. Thus, the UE 402 may then transmit uplink communication and/or receive downlink communication with the base station 404 based on the RAR (e.g., 405).

In some wireless communication systems, the UE 402 may request a Msg 3 PUSCH repetition. For example, the UE 402 may request a Msg 3 PUSCH repetition to improve coverage. In some wireless communication systems, the UE 402 may request the Msg 3 PUSCH repetition via PRACH resources. In some aspects, the UE 402 may indicate the request via RACH occasions (ROs). In some aspects, the UE 402 may not indicate the request via ROs. The UE 402 may request the Msg 3 PUSCH repetition based on different criteria, such as a synchronization signal (SS) reference signal received power (RSRP). The UE 402 may also transmit one or more PRACH repetitions using the PRACH resources that may carry requests for Msg 3 PUSCH repetitions. Aspects provided herein may enable implicitly indicating Msg 3 PUSCH repetitions via PRACH repetitions, which may improve the efficiency of a RACH procedure between a UE and a base station.

Figure 5:
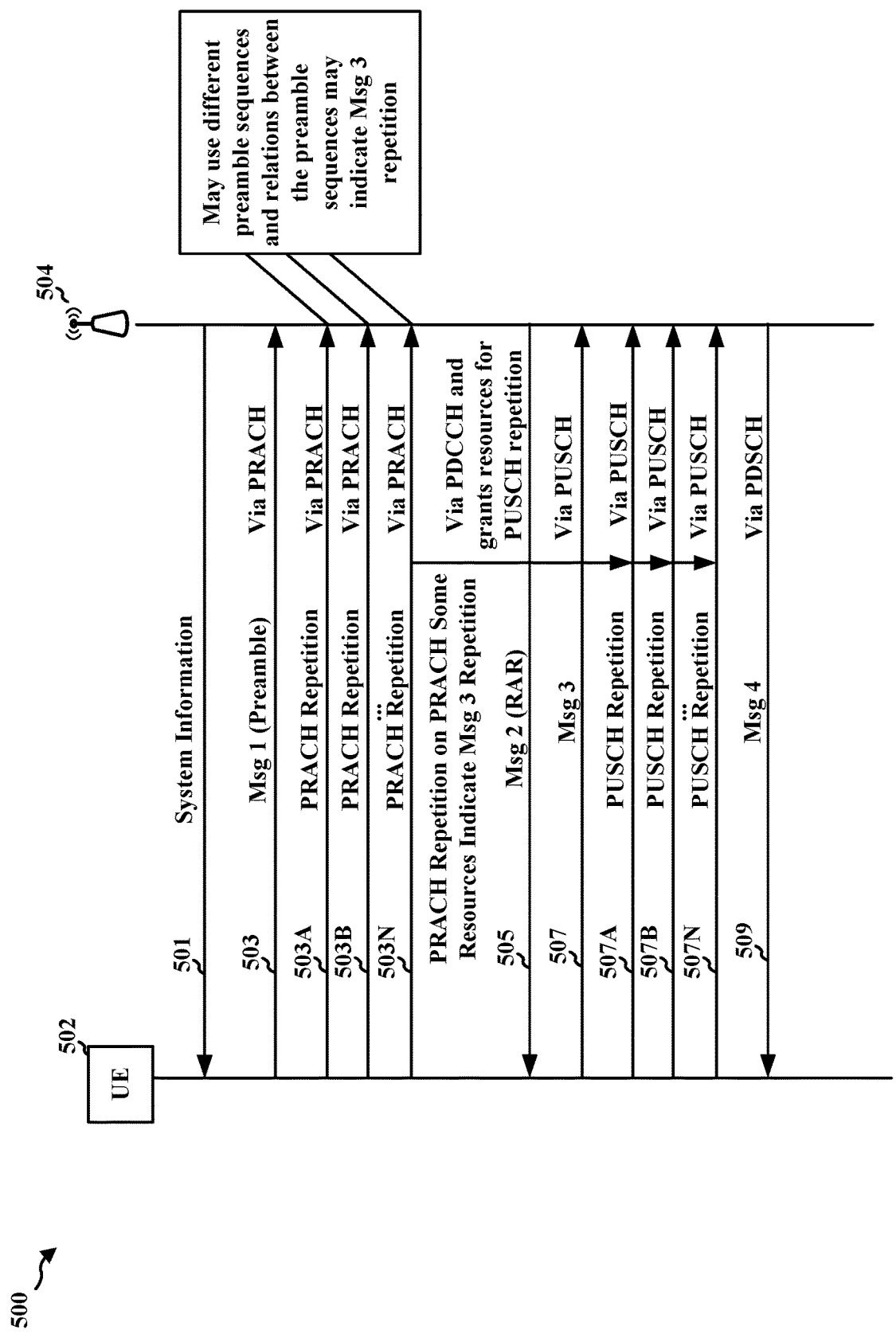
FIG. 5 is a diagram illustrating an example RACH procedure between a UE and a base station.

FIG. 5 is a diagram 500 illustrating an example RACH procedure between a UE 502 and a base station 504. The UE 502 may initiate the random access message exchange by sending, to the base station 504, a first random access message 503 (e.g., Msg 1) including a preamble. Prior to sending the first random access message 503, the UE may obtain random access parameters, e.g., including preamble format parameters, time and frequency resources, parameters for determining root sequences and/or cyclic shifts for a random access preamble, etc., in system information 501 from the base station 504.

As indicated above, RACH preamble parameter may include a cyclic prefix (CP) and a preamble sequence. In some aspects, the preamble format may be one or more of format 0, format 1, format 2, format 3, format A1, format A2, format A3, format B1, format B2, format B3, format B4, format C0, format C1, or the like.

As further indicated above, each of the preamble formats may be associated with a different CP and a different preamble sequence. A preamble format may be grouped into two categories: a long preamble and a short preamble. By way of example, a long preamble may last for more than 1 ms in the time domain and a short preamble may last for less than 1 ms in the time domain. For example, a long preamble may be based on a sequence length of L=839. A long preamble may include preamble format 0, format 1, format 2, and format 3. By way of example, an SCS associated with a long preamble may be 1.25 kHz or 5 kHz. A long preamble may be used for FR1 frequency band. A long preamble with 1.25 kHz SCS may occupy, by way of example, 6 resource blocks in the frequency domain. A long preamble with 5 kHz may occupy, by way of example, 24 resource blocks in the frequency domain.

Additionally, a short preamble may include preamble format A1, format A2, format A3, format B1, format B2, format B3, format B4, format C0, format C1. In some aspects, a short preamble may be based on a sequence length of L=139. In some aspects, an SCS associated with a short preamble may be 15 kHz, 30 kHz, 60 kHz, 120 kHz, or the like. A short preamble may occupy, by way of example, 12 resource blocks in the frequency domain independent of a preamble numerology. In some aspects, a last part of each OFDM symbol in the short preamble may act as a CP for the next OFDM symbol. In some aspects, the length of a preamble OFDM symbol equals the length of data OFDM symbols. In some aspects, multiple short preambles may be multiplexed in time within a single RO.

The preamble may be transmitted with an identifier, such as a random access RNTI (RA-RNTI). The UE 502 may randomly select a random access preamble sequence, e.g., from a set of preamble sequences corresponding to the preamble formats. If the UE 502 randomly selects the preamble sequence, the base station 504 may receive another preamble from a different UE at the same time. In some examples, a preamble sequence may be assigned to the UE 502.

In some aspects, the UE 502 may select one or more preamble sequences randomly or non-randomly. In some instances, the UE 502 and the base station 504 may be configured such that a combination of defined PRACH resources (and/or RACH occasions) and PRACH repetitions may indicate a Msg 3 repetition requested by UE. For example, the UE 502 may transmit one or more PRACH repetitions 503A, 503B, ..., 503N to the base station 504. In some aspects, PRACH repetitions with any sequence may indicate a request of a Msg 3 repetition for a PUSCH repetition 507A, 507B, ... 507N. In such aspects, regardless of the preamble sequences associated with the one or more PRACH repetitions 503A, 503B, ..., 503N, upon receiving the one or more PRACH repetitions 503A, 503B, ..., 503N, the base station 504 may determine (e.g., based on a configuration) that the one or more PRACH repetitions 503A, 503B, ..., 503N indicate a Msg 3 repetition request and may accordingly transmit a grant that schedules PUSCH resources for the Msg 3 repetition in a response, such as a Msg 2 (e.g., the second random access message 505). In some aspects, the base station 504 may determine a PRACH repetition to be associated with a Msg 3 repetition request based on PRACH resources (e.g., configured PRACH resources defined to be associated with a Msg 3 repetition request) that carry the PRACH repetition.

In some aspects, a PRACH repetition with a preamble sequence belonging to the PRACH resources associated with a Msg3 repetition request (via a PRACH) may indicate the request for the Msg3 repetition. For example, one or more preamble sequences associated with one or more formats (e.g., one or more of: format 0, format 1, format 2, format 3, format A1, format A2, format A3, format B1, format B2, format B3, format B4, format C0, or format C1) may be configured to be associated with a Msg3 repetition request. The PRACH resources (i.e., the preamble sequences) for the Msg3 repetition request in the absence of a PRACH repetition may be different from PRACH resources for the Msg3 repetition request in the presence of a PRACH repetition. For example, FIGS. 6A and 6B are diagrams 600 and 650, respectively, illustrating example PRACH resources. As illustrated in FIG. 6A, within a PRACH resource set 606, a set of resources 602 may be configured to identify a Msg3 repetition request in the presence of a PRACH repetition. Within the set of resources 602, a subset of resources 604 may be configured to identify a Msg3 repetition request in the absence of a PRACH repetition. By transmitting PRACH repetitions in the set of resources 602, the UE 502 may be implicitly indicating the Msg 3 repetition request to the base station 504. By transmitting certain preambles in the set of resources 604 without repetition, the UE 502 may be implicitly indicating the Msg 3 repetition request to the base station 504.

As illustrated in FIG. 6B, within a PRACH resource set 616, a set of resources 612 may be configured to identify a Msg3 repetition request in the absence of a PRACH repetition. Within the set of resources 612, a subset of resources 614 may be configured to identify the Msg3 repetition request in the presence of a PRACH repetition. By transmitting PRACH repetitions in the set of resources 614, the UE 502 may be implicitly indicating the Msg 3 repetition request to the base station 504. By transmitting certain preambles in the set of resources 614 without repetition, the UE 502 may be implicitly indicating the Msg 3 repetition request to the base station 504. In some aspects, the configurations illustrated in FIGS. 6A and 6B may be switched based on a coverage of a PRACH compared with a coverage of a Msg 3 (e.g., depending on the PRACH format).

In some aspects, a relation between preamble sequences associated with the one or more PRACH repetitions 503A, 503B, ..., 503N may be configured to be implicitly indicating the Msg 3 repetition request. For example, if the preamble sequences associated with the one or more PRACH repetitions 503A, 503B, ..., 503N are based on a configured sequence, the one or more PRACH repetitions 503A, 503B, ..., 503N may be determined to be implicitly indicating the Msg 3 repetition request by the base station 504. The configured sequence may include the cyclic shift being the same or another defined pattern. In some aspects, selection of a PRACH repetition by the UE may impact the criteria for the request of the Msg3 repetition. For example, using a repetition of a PRACH (e.g., the one or more PRACH repetitions 503A, 503B, ..., 503N) may increase an SS-RSRP threshold that triggers the request of the Msg3 repetition. Such adjustment may allow the base station 504 to perform beam sweeping when receiving PRACH repetitions, which may be used for beam refinement for later messages, e.g., for reception of the Msg3 (which may improve coverage of the Msg3 and potentially avoid using a Msg3 repetition).

The base station 504 may respond to the first random access message 503 by sending a second random access message 505 (e.g., Msg 2) using a PDSCH and including a RAR. The RAR may include, e.g., an identifier of the random access preamble sent by the UE, a time advance (TA), an uplink grant for the UE to transmit data including the Msg 3 PUSCH repetition, a C-RNTI or other identifier, and/or a back-off indicator. Upon receiving the second random access message 505 (e.g., a RAR), the UE 502 may transmit a third random access message 507 (e.g., Msg 3) to the base station 504, e.g., using a PUSCH, that may include an RRC connection request, an RRC connection re-establishment request, or an RRC connection resume request, depending on the trigger for initiating the random access procedure. The base station 504 may then complete the random access procedure by sending a fourth random access message 509 (e.g., Msg 5) to the UE 502, e.g., using a PDCCH for scheduling and a PDSCH for the message. The fourth random access message 509 may include a random access response message that includes timing advancement information, contention resolution information, and/or RRC connection setup information. The UE 502 may monitor for a PDCCH, e.g., with the C-RNTI. If the PDCCH is successfully decoded, the UE 502 may also decode a PDSCH. The UE 502 may send HARQ feedback for any data carried in the fourth random access message. If two UEs sent a same preamble at 703, both UEs may receive the RAR leading both UEs to send a third random access message 507. The base station 504 may resolve such a collision by being able to decode the third random access message from solely one of the UEs and responding with a fourth random access message to that UE. The other UE, which did not receive the fourth random access message 509, may determine that random access did not succeed and may re-attempt random access. Thus, the fourth message may be referred to as a contention resolution message. The fourth random access message 509 may complete the random access procedure. Thus, the UE 502 may then transmit uplink communication and/or receive downlink communication with the base station 504 based on the fourth random access message 509 (e.g., a RAR).

In some aspects, the implicit indication of Msg 3 repetitions may be configured depending on a frequency range, a frequency band, subcarrier spacing, or a PRACH format. For example, the implicit indication of Msg 3 repetitions via PRACH resources and PRACH repetitions may be configured for a short format including format A1, format A2, format A3, format B1, format B2, format B3, format B4, format C0, and/or format C1.

Figure 7:
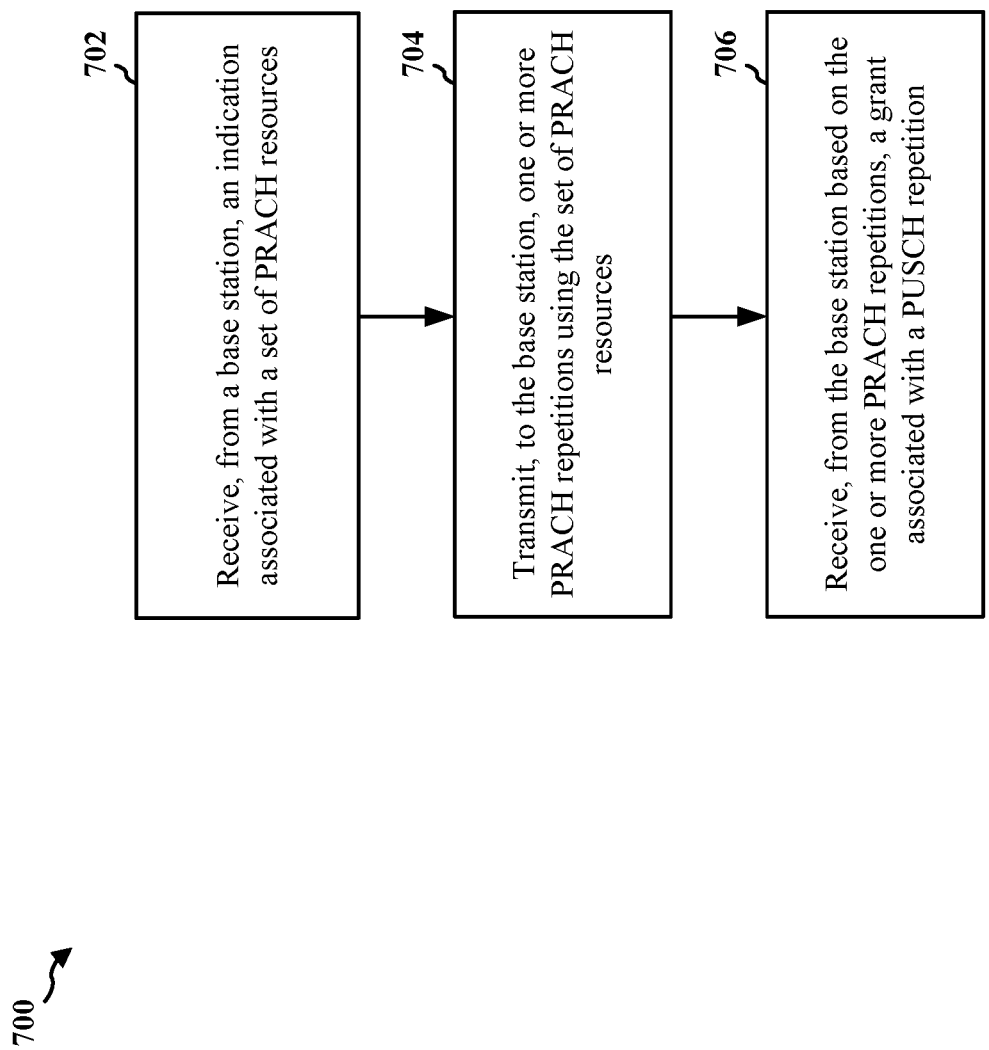
FIG. 7 is a flowchart of a method of wireless communication.

FIG. 7 is a flowchart 700 of a method of wireless communication. The method may be performed by a UE (e.g., the UE 104, the UE 502; the apparatus 902).

At 702, the UE may receive, from a base station, an indication (e.g., system information 501) associated with a set of PRACH resources. For example, the UE 502 may receive, from a base station, an indication (e.g., system information 501) associated with a set of PRACH resources. In some aspects, 702 may be performed by PRACH component 942 in FIG. 9.

At 704, the UE may transmit, to the base station, one or more PRACH repetitions using the set of PRACH resources. For example, the UE 502 may transmit, to the base station 504, one or more PRACH repetitions 503A-503N using the set of PRACH resources. In some aspects, 704 may be performed by PRACH component 942 in FIG. 9. In some aspects, the one or more PRACH repetitions may be associated with a preamble sequence corresponding to a PRACH resource of the set of PRACH resources. In some aspects, the PRACH resource may be associated with a PUSCH repetition request for the PUSCH repetition. In some aspects, the set of PRACH resources may include a first subset of PRACH resources associated with the PUSCH repetition and the one or more PRACH repetitions. In some aspects, the set of PRACH resources may further include a second subset of the PRACH resources associated with the PUSCH repetition and not associated with any of the one or more PRACH repetitions. In some aspects, the first subset of the PRACH resources may be a subset of the second subset of the PRACH resources. In some aspects, the second subset of the PRACH resources may be a subset of the first subset of the PRACH resources. In some aspects, the one or more PRACH repetitions may be associated with a subset of preamble sequences associated with the set of PRACH resources. In some aspects, each of the one or more PRACH repetitions may be associated with each of one or more preamble sequences associated with the set of PRACH resources. In some aspects, each of the one or more preamble sequences may be different. In some aspects, the one or more relations may include a configured cyclic shift. In some aspects, the grant may be further based on a SS RSRP associated with the one or more PRACH repetitions.

At 706, the UE may receive, from the base station based on the one or more PRACH repetitions, a grant associated with a PUSCH repetition. For example, the UE 502 may receive, from the base station 504 based on the one or more PRACH repetitions 503A-507N, a grant (e.g., as part of second random access message 505, such as a Msg 2 RAR) associated with a PUSCH repetition (e.g., 507A-507N). In some aspects, 706 may be performed by PUSCH component 944 in FIG. 9. In some aspects, the PUSCH repetition may be associated with a RACH Msg3. In some aspects, the UE may further transmit the PUSCH repetition using one or more resources indicated in the grant and the base station may receive the PUSCH repetition. In some aspects, the grant may be further based on one or more relations between each of the one or more preamble sequences associated with each of the one or more PRACH repetitions. In some aspects, the grant may be further based on one or more of: a frequency range associated with the set of PRACH resources or the PUSCH repetition, a frequency band associated with the set of PRACH resources or the PUSCH repetition, or a PRACH format associated with the set of PRACH resources. In some aspects, the one or more PRACH repetitions may correspond to a PUSCH repetition request for the PUSCH repetition.

Figure 8:
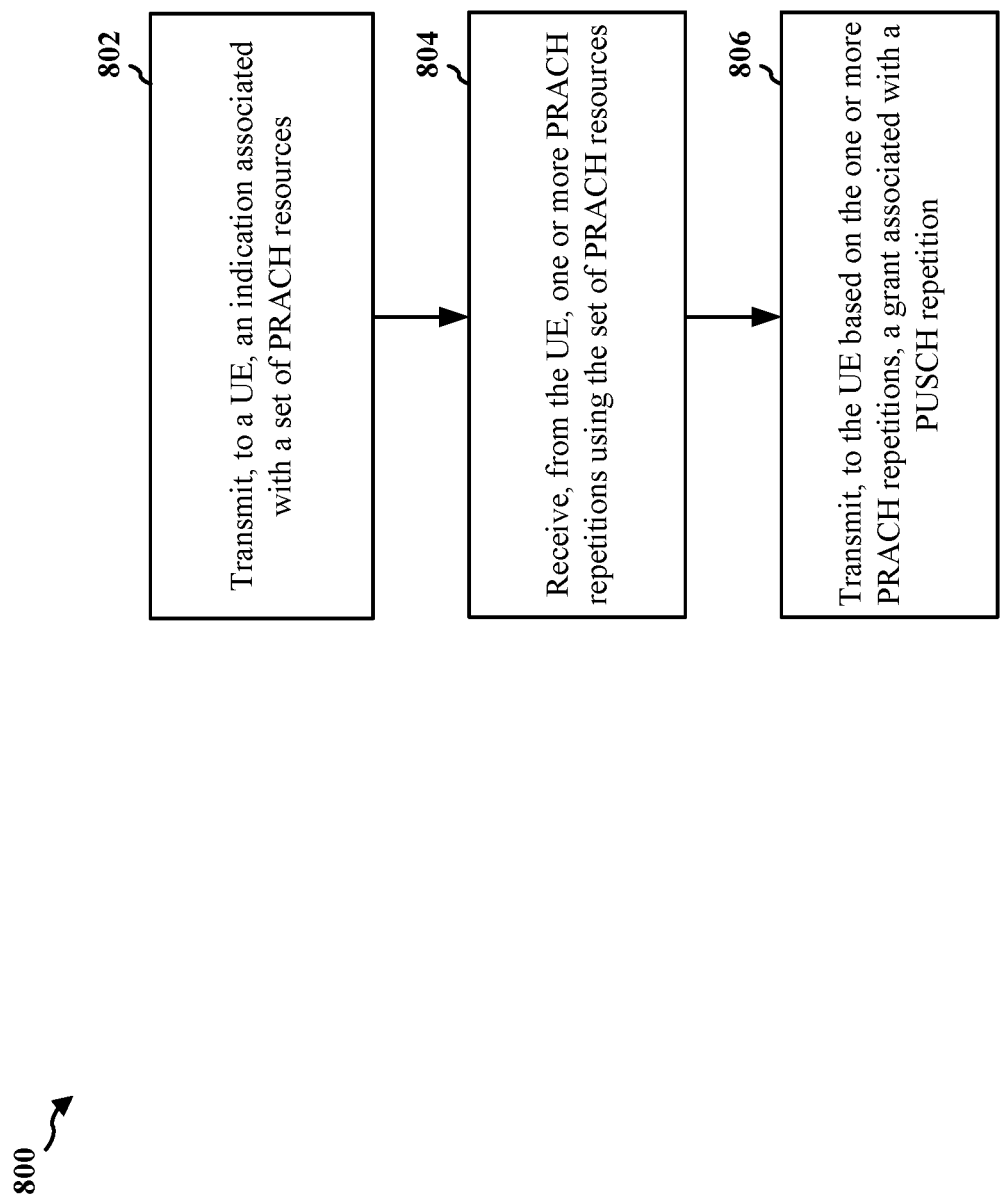
FIG. 8 is a flowchart of a method of wireless communication.

FIG. 8 is a flowchart 800 of a method of wireless communication. The method may be performed by a base station (e.g., the base station 102/180, the base station 504; the apparatus 1002).

At 802, the base station may transmit, to a UE, an indication (e.g., system information 501) associated with a set of PRACH resources. For example, the base station 504 may transmit, to a UE, an indication associated with a set of PRACH resources. In some aspects, 802 may be performed by PRACH component 1042 in FIG. 10.

At 804, the base station may receive, from the UE, one or more PRACH repetitions using the set of PRACH resources. For example, the base station 504 may receive, from the UE, one or more PRACH repetitions 503A-503N using the set of PRACH resources. In some aspects, 804 may be performed by PRACH component 1042 in FIG. 10. In some aspects, the one or more PRACH repetitions may be associated with a preamble sequence corresponding to a PRACH resource of the set of PRACH resources. In some aspects, the PRACH resource may be associated with a PUSCH repetition request for the PUSCH repetition. In some aspects, the set of PRACH resources may include a first subset of PRACH resources associated with the PUSCH repetition and the one or more PRACH repetitions. In some aspects, the set of PRACH resources may further include a second subset of the PRACH resources associated with the PUSCH repetition and not associated with any of the one or more PRACH repetitions. In some aspects, the first subset of the PRACH resources may be a subset of the second subset of the PRACH resources. In some aspects, the second subset of the PRACH resources may be a subset of the first subset of the PRACH resources. In some aspects, the one or more PRACH repetitions may be associated with a subset of preamble sequences associated with the set of PRACH resources. In some aspects, each of the one or more PRACH repetitions may be associated with each of one or more preamble sequences associated with the set of PRACH resources. In some aspects, each of the one or more preamble sequences may be different. In some aspects, the one or more relations may include a configured cyclic shift. In some aspects, the grant may be further based on a SS RSRP associated with the one or more PRACH repetitions.

At 806, the base station may transmit, to the UE based on the one or more PRACH repetitions, a grant associated with a PUSCH repetition. For example, the base station 504 may transmit, to the UE based on the one or more PRACH repetitions, a grant (e.g., as part of second random access message 505, such as a Msg 2 RAR) associated with a PUSCH repetition (e.g., 507A-507N). In some aspects, 806 may be performed by PUSCH component 1044 in FIG. 10. In some aspects, the PUSCH repetition may be associated with a RACH Msg3. In some aspects, the UE may further transmit the PUSCH repetition using one or more resources indicated in the grant and the base station may receive the PUSCH repetition. In some aspects, the grant may be further based on one or more relations between each of the one or more preamble sequences associated with each of the one or more PRACH repetitions. In some aspects, the grant may be further based on one or more of: a frequency range associated with the set of PRACH resources or the PUSCH repetition, a frequency band associated with the set of PRACH resources or the PUSCH repetition, or a PRACH format associated with the set of PRACH resources. In some aspects, the one or more PRACH repetitions may correspond to a PUSCH repetition request for the PUSCH repetition.

Figure 9:
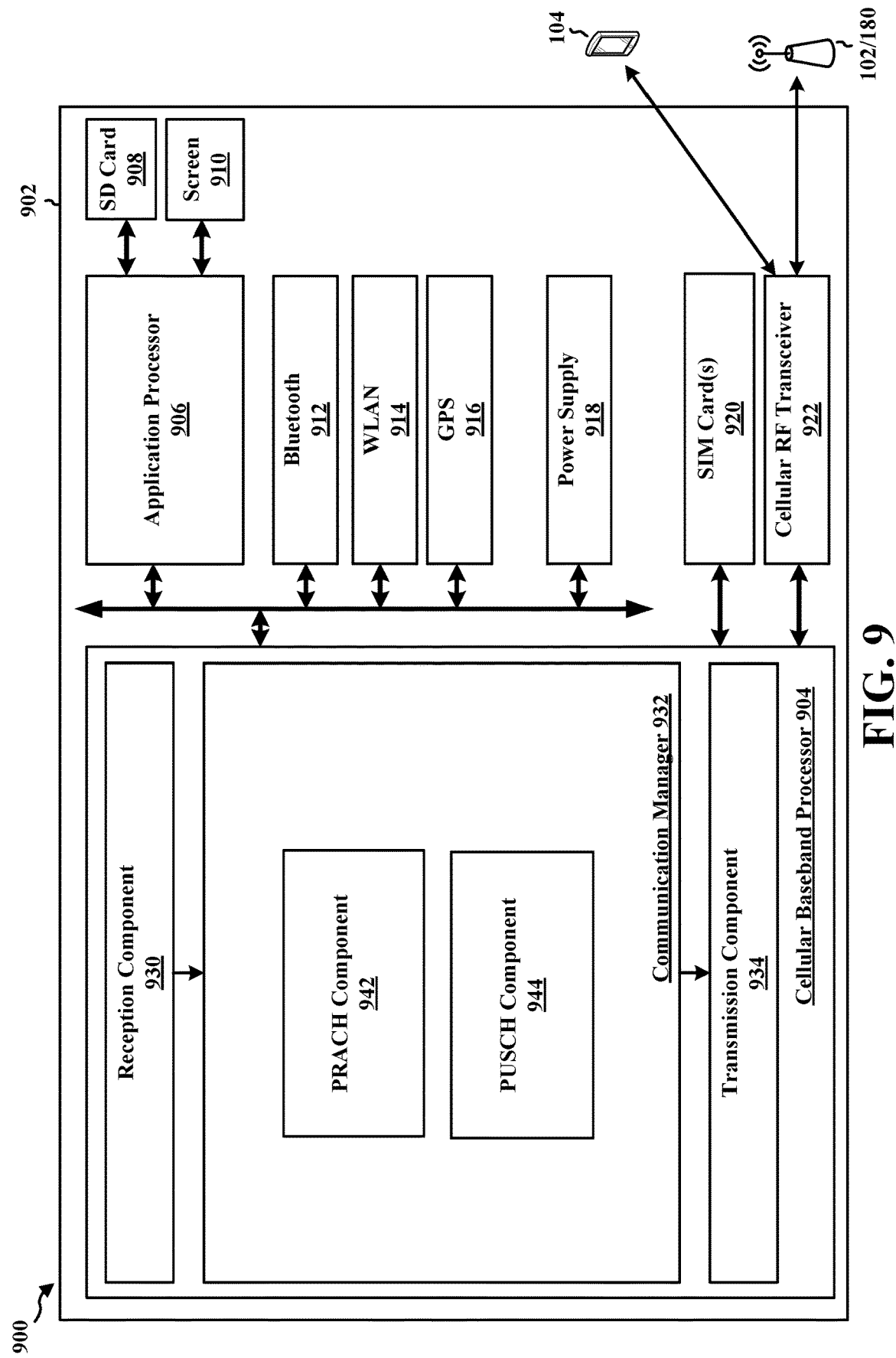
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 may include a PRACH component 942 that is configured to receive, from a base station, an indication associated with a set of PRACH resources and transmit, to the base station, one or more PRACH repetitions using the set of PRACH resources, e.g., as described in connection with 702 and 704 in FIG. 7. The communication manager 932 may further include a PUSCH component 944 that may be configured to receive, from the base station based on the one or more PRACH repetitions, a grant associated with a PUSCH repetition, e.g., as described in connection with 706 in FIG. 7.

The apparatus may include additional components that perform each of the blocks of the algorithm in the flowchart of FIG. 7. As such, each block in the flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, may include means for receiving, from a base station, an indication associated with a set of PRACH resources. The cellular baseband processor 904 may further include means for transmitting, to the base station, one or more PRACH repetitions using the set of PRACH resources. The cellular baseband processor 904 may further include means for receiving, from the base station based on the one or more PRACH repetitions, a grant associated with a PUSCH repetition. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
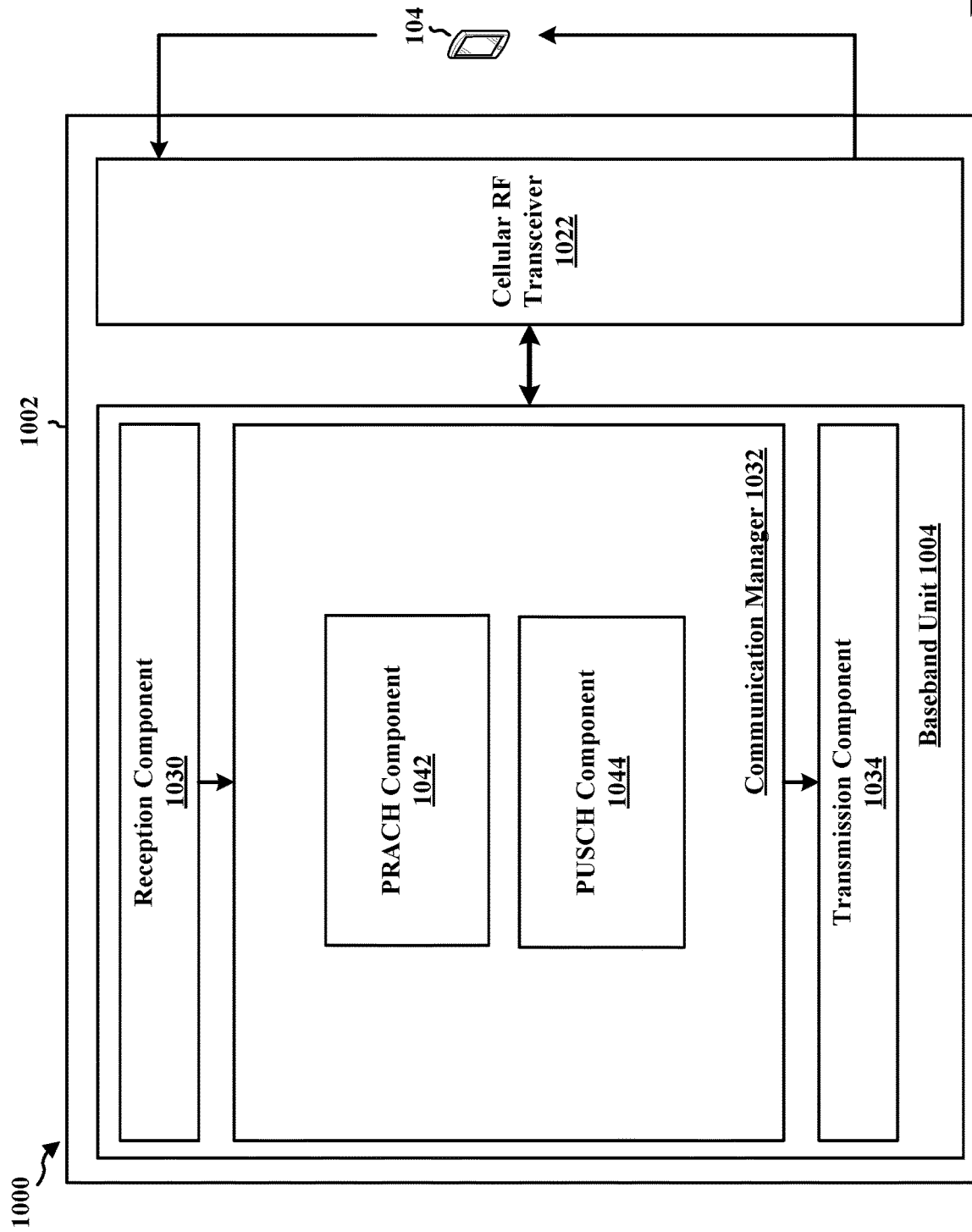
FIG. 10 is a diagram illustrating an example of a hardware implementation for an example apparatus.

FIG. 10 is a diagram 1000 illustrating an example of a hardware implementation for an apparatus 1002. The apparatus 1002 may be a base station, a component of a base station, or may implement base station functionality. In some aspects, the apparatus 902 may include a baseband unit 1004. The baseband unit 1004 may communicate through a cellular RF transceiver 1022 with the UE 104. The baseband unit 1004 may include a computer-readable medium/ memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 may include a PRACH component 1042 that may transmit, to a UE, an indication associated with a set of PRACH resources and receive, from the UE, one or more PRACH repetitions using the set of PRACH resources, e.g., as described in connection with 802 and 804 in FIG. 8. The communication manager 1032 further may include a PUSCH component 1044 that may transmit, to the UE based on the one or more PRACH repetitions, a grant associated with a PUSCH repetition, e.g., as described in connection with 806 in FIG. 8.

The apparatus may include additional components that perform each of the blocks of the algorithm in the flowchart of FIG. 8. As such, each block in the flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, may include means for transmitting, to a UE, an indication associated with a set of PRACH resources. The baseband unit 1004 may further include means for receiving, from the UE, one or more PRACH repetitions using the set of PRACH resources. The baseband unit 1004 may further include means for transmitting, to the UE based on the one or more PRACH repetitions, a grant associated with a PUSCH repetition. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects provided herein may enable implicitly indicating Msg 3 PUSCH repetitions via PRACH repetitions, which may improve the efficiency of a RACH procedure between a UE and a base station.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive, from a base station, an indication associated with a set of PRACH resources; transmit, to the base station, one or more PRACH repetitions using the set of PRACH resources; and receive, from the base station based on the one or more PRACH repetitions, a grant associated with a PUSCH repetition.

Aspect 2 is the apparatus of aspect 1, wherein the PUSCH repetition is associated with a RACH Msg3.

Aspect 3 is the apparatus of any of aspects 1-2, wherein the one or more PRACH repetitions are associated with a preamble sequence corresponding to a PRACH resource of the set of PRACH resources, wherein the PRACH resource is associated with a PUSCH repetition request for the PUSCH repetition.

Aspect 4 is the apparatus of any of aspects 1-3, wherein the set of PRACH resources comprises a first subset of PRACH resources associated with the PUSCH repetition and the one or more PRACH repetitions, and wherein the set of PRACH resources further comprises a second subset of the PRACH resources associated with the PUSCH repetition and not associated with any of the one or more PRACH repetitions.

Aspect 5 is the apparatus of any of aspects 1-4, wherein the first subset of the PRACH resources is a subset of the second subset of the PRACH resources.

Aspect 6 is the apparatus of any of aspects 1-5, wherein the second subset of the PRACH resources is a subset of the first subset of the PRACH resources.

Aspect 7 is the apparatus of any of aspects 1-6, wherein the one or more PRACH repetitions are associated with a subset of preamble sequences associated with the set of PRACH resources.

Aspect 8 is the apparatus of any of aspects 1-7, wherein each of the one or more PRACH repetitions is associated with each of one or more preamble sequences associated with the set of PRACH resources, wherein each of the one or more preamble sequences is different.

Aspect 9 is the apparatus of any of aspects 1-8, wherein the grant is further based on one or more relations between each of the one or more preamble sequences associated with each of the one or more PRACH repetitions.

Aspect 10 is the apparatus of any of aspects 1-9, wherein the one or more relations comprise a configured cyclic shift.

Aspect 11 is the apparatus of any of aspects 1-10, wherein the grant is further based on a SS RSRP associated with the one or more PRACH repetitions.

Aspect 12 is the apparatus of any of aspects 1-11, wherein the grant is further based on one or more of: a frequency range associated with the set of PRACH resources or the PUSCH repetition, a frequency band associated with the set of PRACH resources or the PUSCH repetition, or a PRACH format associated with the set of PRACH resources.

Aspect 13 is the apparatus of any of aspects 1-12, wherein the one or more PRACH repetitions correspond to a PUSCH repetition request for the PUSCH repetition.

Aspect 14 is the apparatus of any of aspects 1-13, further comprising a transceiver coupled to the at least one processor.

Aspect 15 is an apparatus for wireless communication at a base station, comprising: a memory; and at least one processor coupled to the memory and configured to: transmit, to a UE, an indication associated with a set of PRACH resources; receive, from the UE, one or more PRACH repetitions using the set of PRACH resources; and transmit, to the UE based on the one or more PRACH repetitions, a grant associated with a PUSCH repetition.

Aspect 16 is the apparatus of aspect 15, wherein the PUSCH repetition is associated with a RACH Msg3.

Aspect 17 is the apparatus of any of aspects 15-16, wherein the one or more PRACH repetitions are associated with a preamble sequence corresponding to a PRACH resource of the set of PRACH resources, wherein the PRACH resource is associated with a PUSCH repetition request for the PUSCH repetition.

Aspect 18 is the apparatus of any of aspects 15-17, wherein the set of PRACH resources comprises a first subset of PRACH resources associated with the PUSCH repetition and the one or more PRACH repetitions, and wherein the set of PRACH resources further comprises a second subset of the PRACH resources associated with the PUSCH repetition and not associated with any of the one or more PRACH repetitions.

Aspect 19 is the apparatus of any of aspects 15-18, wherein the first subset of the PRACH resources is a subset of the second subset of the PRACH resources.

Aspect 20 is the apparatus of any of aspects 15-19, wherein the second subset of the PRACH resources is a subset of the first subset of the PRACH resources.

Aspect 21 is the apparatus of any of aspects 15-20, wherein the one or more PRACH repetitions are associated with a subset of preamble sequences associated with the set of PRACH resources.

Aspect 22 is the apparatus of any of aspects 15-21, wherein each of the one or more PRACH repetitions is associated with each of one or more preamble sequences associated with the set of PRACH resources, wherein each of the one or more preamble sequences is different.

Aspect 23 is the apparatus of any of aspects 15-22, wherein the grant is further based on one or more relations between each of the one or more preamble sequences associated with each of the one or more PRACH repetitions.

Aspect 24 is the apparatus of any of aspects 15-23, wherein the one or more relations comprise a configured cyclic shift.

Aspect 25 is the apparatus of any of aspects 15-24, wherein the grant is further based on a SS RSRP associated with the one or more PRACH repetitions.

Aspect 26 is the apparatus of any of aspects 15-25, wherein the grant is further based on one or more of: a frequency range associated with the set of PRACH resources or the PUSCH repetition, a frequency band associated with the set of PRACH resources or the PUSCH repetition, or a PRACH format associated with the set of PRACH resources.

Aspect 27 is the apparatus of any of aspects 15-26, wherein the one or more PRACH repetitions correspond to a PUSCH repetition request for the PUSCH repetition.

Aspect 28 is the apparatus of any of aspects 15-27, further comprising a transceiver coupled to the at least one processor.

Aspect 29 is a method of wireless communication for implementing any of aspects 1 to 14.

Aspect 30 is an apparatus for wireless communication including means for implementing any of aspects 1 to 14.

Aspect 31 is a computer-readable medium storing computer executable code, where the code when executed by a processor causes the processor to implement any of aspects 1 to 14.

Aspect 32 is a method of wireless communication for implementing any of aspects 15 to 28.

Aspect 33 is an apparatus for wireless communication including means for implementing any of aspects 15 to 28.

Aspect 34 is a computer-readable medium storing computer executable code, where the code when executed by a processor causes the processor to implement any of aspects 15 to 28.

What is claimed is:

1. An apparatus for wireless communication at a user equipment (UE), comprising:

memory; and at least one processor coupled to the memory and configured to:

receive, from a base station, an indication associated with a set of physical random access channel (PRACH) resources;

transmit, to the base station, one or more PRACH repetitions using the set of PRACH resources to indicate a physical uplink shared channel (PUSCH) repetition request for a PUSCH repetition, wherein the one or more PRACH repetitions are associated with a preamble sequence corresponding to a PRACH resource of the set of PRACH resources; and receive, from the base station based on the one or more PRACH repetitions, a grant associated with the PUSCH repetition.

2. The apparatus of claim 1, wherein the PUSCH repetition is associated with a random access channel (RACH) message 3 (Msg3).

3. The apparatus of claim 1, wherein the set of PRACH resources comprises a first subset of PRACH resources associated with the PUSCH repetition and the one or more PRACH repetitions, and wherein the set of PRACH resources further comprises a second subset of the PRACH resources associated with the PUSCH repetition and not associated with any of the one or more PRACH repetitions.

4. The apparatus of claim 3, wherein the first subset of the PRACH resources is a subset of the second subset of the PRACH resources.

5. The apparatus of claim 3, wherein the second subset of the PRACH resources is a subset of the first subset of the PRACH resources.

6. The apparatus of claim 1, wherein the one or more PRACH repetitions are associated with a subset of preamble sequences associated with the set of PRACH resources.

7. The apparatus of claim 1, wherein each of the one or more PRACH repetitions is associated with each of one or more preamble sequences associated with the set of PRACH resources, wherein each of the one or more preamble sequences is different.

8. The apparatus of claim 7, wherein the grant is further based on one or more relations between each of the one or more preamble sequences associated with each of the one or more PRACH repetitions.

9. The apparatus of claim 8, wherein the one or more relations comprise a configured cyclic shift.

10. The apparatus of claim 1, wherein the grant is further based on a synchronization signal (SS) reference signal received power (RSRP) associated with the one or more PRACH repetitions.

11. The apparatus of claim 1, wherein the grant is further based on one or more of: a frequency range associated with the set of PRACH resources or the PUSCH repetition, a frequency band associated with the set of PRACH resources or the PUSCH repetition, or a PRACH format associated with the set of PRACH resources.

12. The apparatus of claim 1, wherein the one or more PRACH repetitions correspond to the PUSCH repetition request for the PUSCH repetition.

13. The apparatus of claim 1, further comprising a transceiver coupled to the at least one processor.

14. An apparatus for wireless communication at a base station, comprising:

memory; and at least one processor coupled to the memory and configured to:

transmit, to a user equipment (UE), an indication associated with a set of physical random access channel (PRACH) resources;

receive, from the UE, one or more PRACH repetitions using the set of PRACH resources indicating a physical uplink shared channel (PUSCH) repetition request for a PUSCH repetition, wherein the one or more PRACH repetitions are associated with a preamble sequence corresponding to a PRACH resource of the set of PRACH resources; and transmit, to the UE based on the one or more PRACH repetitions, a grant associated with the PUSCH repetition.

15. The apparatus of claim 14, wherein the PUSCH repetition is associated with a random access channel (RACH) message 3 (Msg3).

16. The apparatus of claim 14, wherein the set of PRACH resources comprises a first subset of PRACH resources associated with the PUSCH repetition and the one or more PRACH repetitions, and wherein the set of PRACH resources further comprises a second subset of the PRACH resources associated with the PUSCH repetition and not associated with any of the one or more PRACH repetitions.

17. The apparatus of claim 16, wherein the first subset of the PRACH resources is a subset of the second subset of the PRACH resources.

18. The apparatus of claim 16, wherein the second subset of the PRACH resources is a subset of the first subset of the PRACH resources.

19. The apparatus of claim 14, wherein the one or more PRACH repetitions are associated with a subset of preamble sequences associated with the set of PRACH resources.

20. The apparatus of claim 14, wherein each of the one or more PRACH repetitions is associated with each of one or more preamble sequences associated with the set of PRACH resources, wherein each of the one or more preamble sequences is different.

21. The apparatus of claim 20, wherein the grant is further based on one or more relations between each of the one or more preamble sequences associated with each of the one or more PRACH repetitions.

22. The apparatus of claim 21, wherein the one or more relations comprise a configured cyclic shift.

23. The apparatus of claim 14, wherein the grant is further based on a synchronization signal (SS) reference signal received power (RSRP) associated with the one or more PRACH repetitions.

24. The apparatus of claim 14, wherein the grant is further based on one or more of: a frequency range associated with the set of PRACH resources or the PUSCH repetition, a frequency band associated with the set of PRACH resources or the PUSCH repetition, or a PRACH format associated with the set of PRACH resources.

25. The apparatus of claim 14, wherein the one or more PRACH repetitions correspond to the PUSCH repetition request for the PUSCH repetition.

26. The apparatus of claim 14, further comprising a transceiver coupled to the at least one processor.

27. A method for wireless communication at a user equipment (UE), comprising:

receiving, from a base station, an indication associated with a set of physical random access channel (PRACH) resources;

transmitting, to the base station, one or more PRACH repetitions using the set of PRACH resources to indicate a physical uplink shared channel (PUSCH) repetition request for a PUSCH repetition, wherein the one or more PRACH repetitions are associated with a preamble sequence corresponding to a PRACH resource of the set of PRACH resources; and receiving, from the base station based on the one or more PRACH repetitions, a grant associated with the PUSCH repetition.

28. A method for wireless communication at a base station, comprising:

transmitting, to a user equipment (UE), an indication associated with a set of physical random access channel (PRACH) resources;

receiving, from the UE, one or more PRACH repetitions using the set of PRACH resources indicating a physical uplink shared channel (PUSCH) repetition request for a PUSCH repetition, wherein the one or more PRACH repetitions are associated with a preamble sequence corresponding to a PRACH resource of the set of PRACH resources; and transmitting, to the UE based on the one or more PRACH repetitions, a grant associated with the PUSCH repetition.

* * * * *